United States Patent
Winkler et al.

(10) Patent No.: US 8,833,061 B2
(45) Date of Patent: Sep. 16, 2014

(54) METHOD AND DEVICE FOR REGENERATING A PARTICLE FILTER IN A Y-EXHAUST GAS SYSTEM

(75) Inventors: Klaus Winkler, Rutesheim (DE); Thomas Zein, Sindelfingen (DE)

(73) Assignee: Robert Bosch GmbH, Stuttgart (DE)

(*) Notice: Subject to any disclaimer, the term of this patent is extended or adjusted under 35 U.S.C. 154(b) by 239 days.

(21) Appl. No.: 13/442,270

(22) Filed: Apr. 9, 2012

(65) Prior Publication Data

US 2012/0260631 A1  Oct. 18, 2012

(30) Foreign Application Priority Data

Apr. 14, 2011  (DE) .......................... 10 2011 007 364

(51) Int. Cl.

| | |
|---|---|
| F01N 3/00 | (2006.01) |
| F02D 41/02 | (2006.01) |
| F01N 3/08 | (2006.01) |
| F01N 13/04 | (2010.01) |
| F01N 3/10 | (2006.01) |
| F01N 3/023 | (2006.01) |
| F01N 3/28 | (2006.01) |
| F02D 41/14 | (2006.01) |
| F01N 3/035 | (2006.01) |

(52) U.S. Cl.
CPC ......... *F02D 41/0275* (2013.01); *F01N 2470/14* (2013.01); *F02D 41/029* (2013.01); *F01N 3/0814* (2013.01); *F01N 13/04* (2013.01); *F01N 3/023* (2013.01); *F01N 3/105* (2013.01); *Y02T 10/26* (2013.01); *Y02T 10/22* (2013.01); *F01N 3/2825* (2013.01); *F02D 41/1467* (2013.01); *F01N 3/035* (2013.01); *F02D 41/025* (2013.01); *F01N 3/101* (2013.01); *F02D 2041/1433* (2013.01)
USPC .................... 60/295; 60/274; 60/286; 60/297

(58) Field of Classification Search
USPC ............................ 60/274, 286, 295, 297, 301
See application file for complete search history.

(56) References Cited

U.S. PATENT DOCUMENTS

| 7,640,728 B2* | 1/2010 | Yoshizaki et al. | 60/286 |
| 7,743,608 B2* | 6/2010 | Ogiso | 60/295 |
| 8,327,625 B2* | 12/2012 | Eckhoff et al. | 60/295 |
| 8,341,947 B2* | 1/2013 | Hepburn et al. | 60/297 |
| 8,512,658 B2* | 8/2013 | Eckhoff et al. | 423/213.2 |

FOREIGN PATENT DOCUMENTS

DE  10 2006 003487  7/2007

* cited by examiner

*Primary Examiner* — Binh Q Tran
(74) *Attorney, Agent, or Firm* — Kenyon & Kenyon LLP

(57) ABSTRACT

A method and device for regenerating an exhaust gas aftertreatment component for filtering soot particles in an engine having a first cylinder group, exhaust gases being guided through an exhaust gas channel and whose fuel/air mixture ratio is set via a fuel metering system, activated via a control unit, by a control loop for setting a lambda value using a signal of a first exhaust gas sensor, in the exhaust gas flow direction upstream from a catalytic converter, having at least another cylinder group, exhaust gases being guided through another exhaust gas channel and whose fuel/air mixture ratio is set via another fuel metering system by another control loop for setting another lambda value based on the signal of another exhaust gas sensor, in the exhaust gas flow direction upstream from a catalytic converter, the separate channels joined together downstream to form a shared channel, having a shared catalytic converter.

8 Claims, 2 Drawing Sheets

METHOD AND DEVICE FOR REGENERATING A PARTICLE FILTER IN A Y-EXHAUST GAS SYSTEM

RELATED APPLICATION INFORMATION

The present application claims priority to and the benefit of German patent application no. 10 2011 007 364.7, which was filed in Germany on Apr. 14, 2011, the disclosure of which is incorporated herein by reference.

FIELD OF THE INVENTION

The exemplary embodiments and/or exemplary methods of the present invention relate to a method for regenerating at least one exhaust gas aftertreatment component for filtering soot particles in an internal combustion engine having a first group of cylinders, whose exhaust gases are guided through a first exhaust gas channel, and whose fuel/air mixture ratio is set via a first fuel metering system, activated via a control unit, by a first control loop for setting a first lambda value based on the signal of a first exhaust gas sensor, which is situated upstream from a catalytic converter in the exhaust gas channel in the flow direction of the exhaust gas, and having at least one further group of cylinders, whose exhaust gases are guided through a further exhaust gas channel and whose fuel/air mixture is set via a further fuel metering system by a further control loop for setting a further lambda value based on the signal of a further exhaust gas sensor, which is situated upstream from a catalytic converter in the exhaust gas channel in the flow direction of the exhaust gas, the separate exhaust gas channels being joined together downstream from the catalytic converters to form a shared exhaust gas channel, in which a shared catalytic converter is situated.

Furthermore, the exemplary embodiments and/or exemplary methods of the present invention relate to a corresponding device for carrying out the method according to the present invention.

BACKGROUND INFORMATION

According to the currently applicable EU limiting values, particle filters are not yet required in gasoline-powered internal combustion engines. The exhaust gas aftertreatment of the pollutant components, such as non-combusted hydrocarbons (HC), carbon monoxide (CO), and nitrogen oxides ($NO_x$), is performed in the case of homogeneous concepts via a three-way catalytic converter. In the case of lean-burn combustion systems, a storage catalytic converter for the $NO_x$ is connected downstream. However, there is also a three-way catalytic converter situated close to the engine here, which fulfills the three-way function in homogeneous operation and is required for the oxidation of CO and HC in lean operation. For homogeneous concepts, a main catalytic converter, which may also be situated structurally separated, for example, in the subfloor of the vehicle, is often connected downstream from the primary catalytic converter.

Future stricter exhaust gas limiting values with respect to particle emissions as required, for example, from 2014 by the EU limiting values according to the exhaust gas regulation EU6, require that gasoline-powered internal combustion engines will also have to be equipped with a particle filter. The exhaust gas flow is conducted in this case, identically to diesel-engine use, through the particle filter (GPF=gasoline particle filter) situated in the exhaust gas system, which separates the solid particles located in the exhaust gas and retains them in the filter substrate. The soot mass deposited in the filter results in steady clogging of the filter and thus an increase of the exhaust gas counter pressure, however, which has a negative effect on the engine performance and the fuel consumption.

The particle filter effect is based on a porous ceramic substrate having alternately closed channels, which the exhaust gas is forced to flow through. The soot particles are deposited in this case on the surface and in the walls (depth filtration) of the porous substrate. These particle filters clog with soot during operation and must therefore be regenerated at certain time intervals. The maximum soot load of the particle filter is decisively a function of the substrate material of the filter, for example, the porosity, the cell density, and the geometry of the channels, and in particular the melting temperature and the thermal capacity. This is also true for catalytically coated particle filter substrates which, in addition to a three-way catalytic converter effect, may also retain soot particles, and are therefore also referred to as four-way catalytic converters (FWC).

Conventional regeneration strategies are based on special injection profiles and air flow rates, so that an elevated temperature is achieved in the exhaust gas channel of the internal combustion engine and, in the event of oxygen excess, the oxidation of the soot may occur. Manifold measures are used for this purpose, because the required high exhaust gas temperatures of 600° C. to 650° C. are only achieved close to full load in normal operation.

In a multicylinder internal combustion engine, the cylinders are frequently situated in two cylinder banks. The air required for the combustion is supplied to all cylinders via a shared intake manifold. An air flow meter may be provided therein, using which the air mass suctioned in via the intake manifold is measurable. On the outlet side, separate exhaust gas channels are connected to the two cylinder banks, which are also referred to as exhaust gas banks. An exhaust gas sensor, which is provided for measuring the composition of the exhaust gas, is assigned to each of these exhaust gas channels. In a gasoline engine, both exhaust gas sensors are typically implemented as lambda sensors. The exhaust gas aftertreatment is typically performed by catalytic converters situated close to the engine in the separate exhaust gas channels or with the aid of a catalytic converter situated in a shared exhaust gas channel, the separate exhaust gas channels typically first being joined together into the shared exhaust gas system at the subfloor of the vehicle. These are referred to as so-called Y-systems.

The fuel quantities to be injected into the two cylinder banks are each separately calculated by a control unit as a function of the output signals of the lambda sensors situated in the exhaust gas channels of the two cylinder banks, a control factor, which influences the injection of fuel into the respective associated cylinder bank, being calculated in each case as a function of the output signals of the two lambda sensors. This control factor is typically generated with the aid of a so-called lambda controller, a separate lambda controller being assigned to each of the two cylinder banks.

A method for lambda modulation is discussed in DE 10 2006 003487 A1, in an internal combustion engine having a first group of cylinders whose exhaust gases are guided through a first exhaust gas channel and whose fuel/air mixture ratio is set via a fuel metering system, activated via a control unit, by a first control loop for setting a first lambda value based on the signal of a first exhaust gas sensor, which is situated upstream from a catalytic converter of the exhaust gas channel in the flow direction of the exhaust gas, and having at least one further group of cylinders, whose exhaust gases are guided through a further exhaust gas channel and whose fuel/air mixture is set via a fuel metering system by a further control loop for setting a further lambda value based on the signal of a further exhaust gas sensor, which is situated upstream from the catalytic converter or a further separate catalytic converter of the exhaust gas channel in the flow direction of the exhaust gas, the lambda modulation of the lambda values for the first exhaust gas channel and that of the further exhaust gas channel being synchronized. Using this method, a variation of the engine torque is reduced and therefore the driving comfort is improved during operation of an internal combustion engine having multiple exhaust gas banks. Furthermore, the catalytic converter diagnosis may therefore be improved in the case of multiple exhaust gas banks, which are joined together upstream from a shared catalytic converter (Y-systems).

In systems having an $NO_x$ storage catalytic converter (NSC), it is necessary to desulfurize the NSC at regular intervals, because it is clogged with $SO_x$ due to the sulfur content in the gasoline and therefore its $NO_x$ storage capacity is reduced. Therefore, for the desulfurization of the NSC, it is necessary to generate high exhaust gas temperatures and to introduce rich gas into the catalytic converter. In the case of a Y-system, this may be achieved by a so-called lambda split method, as is also understood to be used, for example, in DE 10 2006 003487 A1. One exhaust gas bank is operated rich, and the other slightly lean, so that in total, after the junction, a slightly rich exhaust gas results. In this way, non-combusted or partially combusted reactive components (HC and CO) and oxygen meet in the NSC. This results in the exothermic reaction and therefore in the temperature increase in the catalytic converter. Because the exhaust gas is slightly rich on average at the same time, the accumulated $SO_x$ is released.

Regenerating a particle filter in gasoline-powered engines (GPF) or also a coated particle filter (four-way catalytic converter or FWC) also requires an oxygen excess in addition to a high exhaust gas temperature. Therefore, during the regeneration, it is necessary to deviate from the typical $\lambda=1$ operating strategy in gasoline-powered internal combustion engines and to use a leaner lambda value. However, this is equivalent to an $NO_x$ breakdown, because the three-way catalytic converter or also the coated particle filter cannot convert $NO_x$ in lean operation.

SUMMARY OF THE INVENTION

The exemplary embodiments and/or exemplary methods of the present invention relate to a method for regenerating at least one exhaust gas aftertreatment component for filtering soot particles in an internal combustion engine having a first group of cylinders, whose exhaust gases are guided through a first exhaust gas channel and whose fuel/air mixture ratio is set via a first fuel metering system, activated via a control unit, by a first control loop for setting a first lambda value based on the signal of a first exhaust gas sensor, which is situated in the exhaust gas channel in the flow direction of the exhaust gas upstream from a catalytic converter, and having at least one further group of cylinders, whose exhaust gases are guided through a further exhaust gas channel and whose fuel/air mixture ratio is set via a further fuel metering system by a further control loop for setting a further lambda value based on the signal of a further exhaust gas sensor, which is situated in the exhaust gas channel in the flow direction of the exhaust gas upstream from a catalytic converter, the separate exhaust gas channels being joined together downstream from the catalytic converters to form a shared exhaust gas channel, in which a shared catalytic converter is situated.

It is provided according to the exemplary embodiments and/or exemplary methods of the present invention that the exhaust gas aftertreatment components for filtering the soot particles are each situated in the still separate exhaust gas channels and engine-internal measures are carried out to heat up this component for the first cylinder group and subsequently the lambda value in the first exhaust gas channel, which is assigned to this cylinder group, is set to a lambda value $\lambda>1$ with the aid of a lambda modulation, a lambda value $\lambda<1$ being set simultaneously in the further exhaust gas channel, or the exhaust gas aftertreatment component for filtering the soot particles is situated in the shared exhaust gas channel and the regeneration of the particle-filtering component is carried out in both exhaust gas channels with the aid of engine-internal measures and a lambda modulation which are adapted to one another.

Furthermore, the exemplary embodiments and/or exemplary methods of the present invention relate to a corresponding device for carrying out the method according to the present invention.

Using the suggested method and the device for carrying out the method, an operating strategy may be provided in particular for gasoline engines having a Y-exhaust gas system, using which a particularly low-emission regeneration of the soot-filtering components is made possible. In addition, advantages result during the desulfurization of $NO_x$ storage catalytic converters, if they are used in combination with the soot-filtering components.

It is therefore an object of the exemplary embodiments and/or exemplary methods of the present invention to provide a method, using which, on the one hand, a low-emission regeneration of the particle filter and, on the other hand, in systems having an $NO_x$ storage catalytic converter, a joint regeneration strategy may be carried out.

Furthermore, it is the object of the exemplary embodiments and/or exemplary methods of the present invention to provide a corresponding device or system of the exhaust gas-cleaning components for carrying out the method.

The object relating to the method may be achieved by the features described herein.

The method according to the present invention provides that the exhaust gas aftertreatment components for filtering the soot particles are each situated in the still separate exhaust gas channels and engine-internal measures are carried out to heat up this component for the first cylinder group and subsequently, with the aid of a lambda modulation, the lambda value in the first exhaust gas channel assigned to this cylinder group is set to a lambda value $\lambda>1$, a lambda value $\lambda<1$ being set simultaneously in the further exhaust gas channel. Alternatively, the exhaust gas aftertreatment component for filtering the soot particles is situated in the shared exhaust gas channel and the regeneration of the particle-filtering component is performed in both exhaust gas channels with the aid of engine-internal measures and a lambda modulation, which are adapted to one another. Using the suggested method, an operating strategy may be provided, using which a particularly low-emission regeneration of the soot-filtering components is made possible, since an $NO_x$ breakdown, which may otherwise occur in a lean operating mode of the catalytic converter, may be avoided. In spite of the regeneration phases within the various exhaust gas channels, an optimum lambda range for the shared catalytic converter may be ensured using this measure.

Particularly effective reduction of the particle emission may be achieved if particle filters or four-way catalytic converters are used as the particle-filtering components; the four-way catalytic converters may be designed as catalytically coated filter substrates made of ceramic. Particle filters have been known for some time as diesel particle filters and have been technically optimized multiple times in the meantime. Four-way catalytic converters are based on these particle filter substrates.

An optimum conversion of the pollutants $NO_x$, CO, and HC in the exhaust gas may be ensured for the shared catalytic converter if, during the regeneration of the particle-filtering components in the separate exhaust gas channels, the lambda modulation within the exhaust gas channels is synchronized in such a way that after the exhaust gases are joined together in the shared exhaust gas channel upstream from the shared catalytic converter, a lambda value equal or close to 1 is set.

If a further lambda control loop having a further exhaust gas sensor, which is situated downstream from the shared catalytic converter in the flow direction of the exhaust gas, is additionally used, the overall mixture may be very precisely adjusted optimally to the conversion point of the catalytic converter. A Nernst sensor may be used as the exhaust gas sensor downstream from the shared catalytic converter.

A particularly advantageous system for effective pollutant reduction results if a three-way catalytic converter is used as the shared catalytic converter in the shared exhaust gas system, and a four-way catalytic converter or a combination of a three-way catalytic converter and a particle filter connected downstream therefrom are used as the catalytic converters in each of the separate exhaust gas systems. In addition to the nitrogen oxides, carbon monoxide, and non-combusted hydrocarbons, soot particles may also be effectively removed using this design, so that it is also possible to reliably meet future exhaust gas limiting values or exhaust gas regulations.

Particularly effective $NO_x$ reduction may be achieved in conjunction with an $NO_x$ storage catalytic converter (NSC). A particularly effective system results if the particle-filtering components in the exhaust gas aftertreatment system are at least partially combined with at least one $NO_x$ storage catalytic converter. Since both the physical boundary conditions and also the regeneration frequency of the two systems (NSC and GPF) are similar, it is advantageous if the regeneration of the particle-filtering components and the desulfurization of the $NO_x$ storage catalytic converter are combined in one chronological phase and adapted to one another. Additional regeneration phases, which increase emissions and consumption, are thus avoided.

For this purpose, in a method variant, the desulfurization of the $NO_x$ storage catalytic converter is initially performed within this joint regeneration phase in that the $NO_x$ storage catalytic converter is heated up by engine-internal measures and a lambda value $\lambda<1$ is set. Effective desulfurization of the $NO_x$ storage catalytic converter may thus be achieved. After completed desulfurization of the $NO_x$ storage catalytic converter, a lambda value $\lambda>1$ is set for regenerating the particle-filtering components, so that the soot particles may be oxidized using the oxygen excess in the exhaust gas.

If the frequency of the regeneration phases for the particle-filtering components and the $NO_x$ storage catalytic converter is determined as a function of a soot load, which is predicted from a model or measured using particle sensors, and/or determined as a function of a sulfur content of the fuel used, regeneration as needed may be ensured and increased fuel consumption or the number of phases having a possible loss of driving comfort may be minimized.

A use of the method, as described above, including its variants, provides the use in internal combustion engines designed as gasoline engines, which have a Y-configuration of the exhaust gas system, in which particle filters or a combined system made of filter and three-way catalytic converter are used. This applies for homogeneous operating concepts and also lean operating concepts of the internal combustion engine. In the case of homogeneous concepts, this method may be used both in engines having an intake manifold and also in direct-injection engines. Therefore, in particular for gasoline-powered engines, it is possible to meet the stricter European exhaust gas limiting values according to EU6.

The object relating to the device is achieved in that the exhaust gas aftertreatment components for filtering the soot particles are each situated in the still separate exhaust gas channels or are situated in the shared exhaust gas channel and engine-internal measures for heating these components are predefinable separately for the cylinder groups using the control unit and for both exhaust gas channels the lambda value is settable by separate lambda modulations in the two exhaust gas channels, these being synchronized with one another, or the regeneration of the particle-filtering component in the shared exhaust gas channel may be carried out in both exhaust gas channels, with the aid of engine-internal measures and a lambda modulation, which are adapted to one another, the control unit having devices for carrying out the above-described method including its variants.

It may be provided that the particle-filtering components are at least partially combined with an $NO_x$ storage catalytic converter, which is typically connected upstream from the particle filter, whereby effective nitrogen oxide retention results in addition to the reduction of particle concentrations.

The functionality of the method including its variants may be implemented in software as an add-on to a conventional particle filter diagnosis or OBD and/or regeneration strategy within the control unit. The application outlay is therefore low and may be easily retrofitted by a software update. The control unit may be an integral component of a higher-order engine controller (e.g., inside engine control unit ECU).

The present invention will be explained in greater detail hereafter on the basis of an exemplary embodiment shown in the figures.

DETAILED DESCRIPTION

Figure 1:
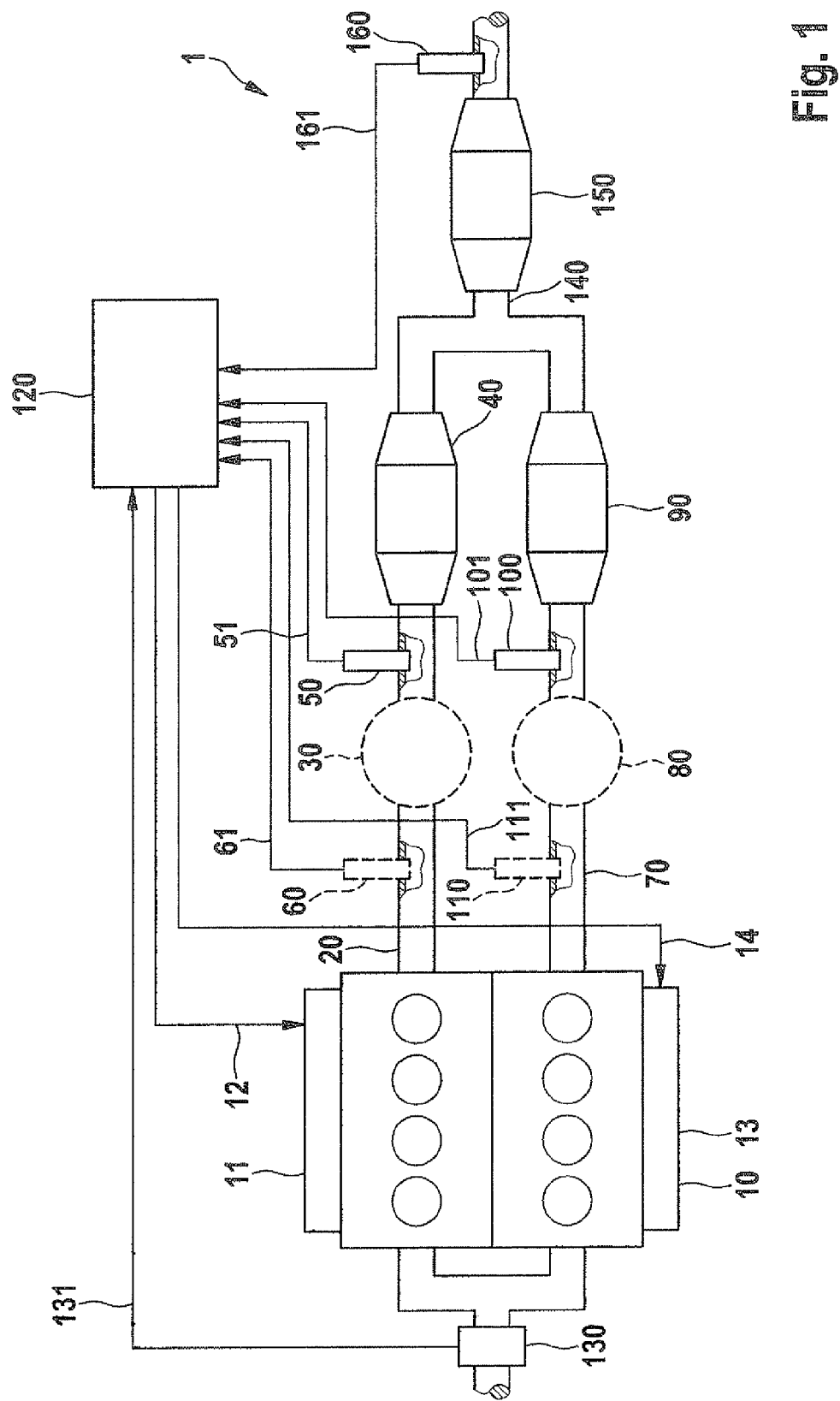
FIG. 1 shows a schematic view of the technical environment in which the method according to the present invention may be used.

FIG. 1 shows a schematic view of the technical environment in which the present invention may be used. The main components of an internal combustion engine 1 are shown, which is designed as a bi-turbo eight-cylinder engine, having a twin-pipe exhaust gas system, in the exemplary embodiment, the exhaust gas flows of each 4 cylinders being joined together in one exhaust gas channel (exhaust gas bank).

An engine block 10, a control unit 120, which cooperates with a control device, and two exhaust gas channels 20, 70, which each have at least one catalytic converter 40, 90, are shown as the main components of internal combustion engine 1. In the example shown, at least one exhaust gas sensor 50, 100, which may be designed as a continuously operating sensor or as a so-called Nernst sensor, is situated in each of the two exhaust gas channels 20, 70 upstream from catalytic converters 40, 90. Exhaust gas sensors 50, 100 are connected with the aid of signal lines 51, 101 to control unit 120 for controlling a lambda value, control unit 120 being connected with the aid of signal lines 12, 14 to fuel metering systems 11, 13 on engine block 10. Fuel metering systems 11, 13 are each designed for four cylinders in the example shown and are typically activated by a higher-order engine controller (not shown here). A fuel/air mixture may be set in such a way that a certain lambda value may be set in each exhaust gas channel 20, 70 with the aid of control loops 50, 120, 11 or 100, 120, 13 using fuel metering systems 11, 13 and an air flow meter 130, which is connected with the aid of a signal line 131 to control unit 120.

To increase the performance, it is additionally provided in the exemplary embodiment shown that an exhaust gas turbocharger 30, 80 is situated in each of exhaust gas channels 20, 70 upstream from exhaust gas sensors 50, 100 and catalytic converters 40, 90. Control unit 120 is connected with the aid of signal lines 61, 111 to temperature sensors 60, 110 in one exhaust gas channel 20 upstream from assigned exhaust gas turbocharger 30 and in other exhaust gas channel 70 upstream from exhaust gas turbocharger 80 assigned thereto, temperature sensors 60, 110 being used to protect exhaust gas turbochargers 30, 80 from excessive temperatures.

Figure 2:
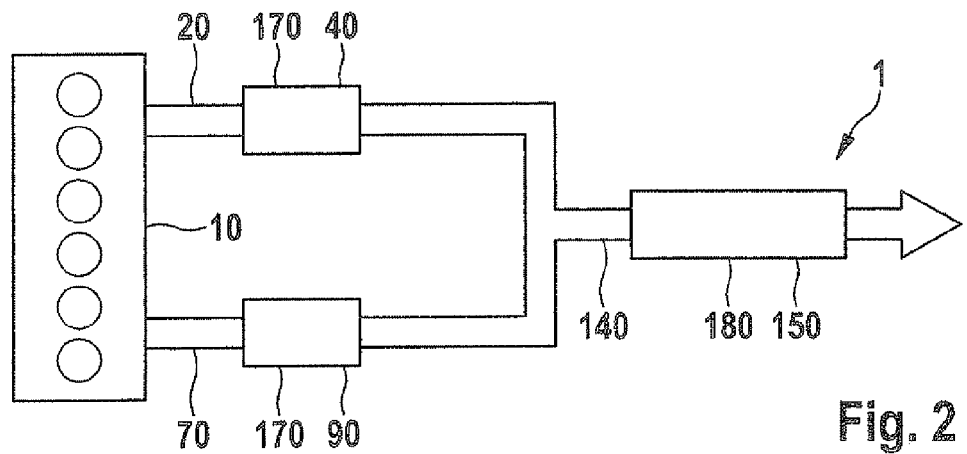
FIG. 2 shows an exemplary system for a Y-exhaust gas system having different catalytic converters.
Figure 3:
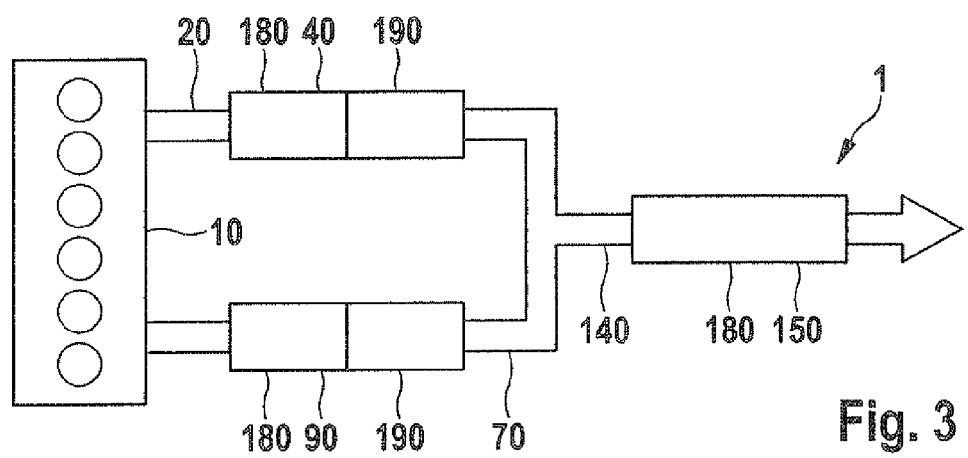
FIG. 3 shows a further exemplary system of the Y-exhaust gas system having catalytic converters and particle filters.
Figure 4:
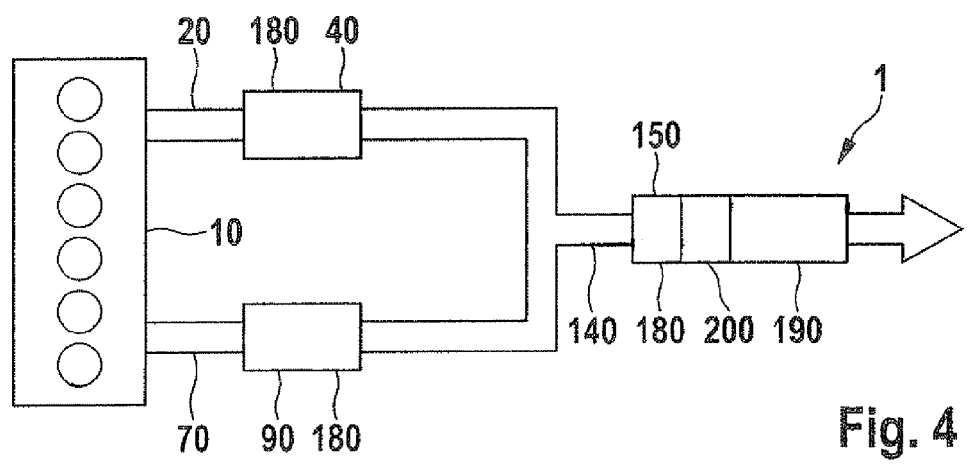
FIG. 4 shows a further exemplary system of the Y-exhaust gas system having catalytic converters, an $NO_x$ storage catalytic converter, and a particle filter.

Proceeding from this system, two exhaust gas banks may be joined together upstream from a shared catalytic converter 150 (subfloor catalytic converter) as a so-called Y-assemblage to form a shared exhaust gas channel 140, as is also schematically shown in FIGS. 2, 3, and 4. In the example shown, another exhaust gas sensor 160, which is also connected via a corresponding signal line 161 to control unit 120, is situated downstream from shared catalytic converter 150.

In a first embodiment of the present invention, as shown in FIG. 2, a Y-exhaust gas system is provided, in which a four-way catalytic converter 170 (FWC) (corresponding to catalytic converters 40, 90 in FIG. 1) is situated in each of initially independent exhaust gas channels 20, 70 of engine block 10 of internal combustion engine 1, and a shared three-way catalytic converter 180 (corresponding to catalytic converter 150 in FIG. 1) is situated after the joining to form shared exhaust gas channel 140.

FIG. 3 shows an alternative thereto, in which, in the flow direction of the exhaust gas, a three-way catalytic converter 180 designed as a primary catalytic converter and a downstream particle filter 190 (GPF) are situated in each of initially independent exhaust gas channels 20, 70 of engine block 10, and a shared three-way catalytic converter 180 is situated after the joining to form shared exhaust gas channel 140.

If one of four-way catalytic converters 170 (FWC) or particle filters 190 (GPF) is loaded with particles in such a way that a regeneration must be triggered, as is provided by the method according to the present invention, one of exhaust gas channels 20 having four-way catalytic converter 170 or having combination three-way catalytic converter 180/particle filter 190 is initially heated up by a catalytic converter heating measure, for example, by an ignition which is initiated late (ignition angle retarding). The mixture of this bank is subsequently adjusted in such a way that overall a lean lambda (λ>1) only occurs in this exhaust gas bank and therefore sufficient oxygen is available for burning off the soot particles. At the same time, in the other exhaust gas channel 70, a rich lambda (λ<1) is set in such a way that after the Y-assemblage, in total a lambda λ=1 occurs in shared exhaust gas channel 140.

To be able to adapt the individual lambda values within both exhaust gas channels 20, 70 to one another as best as possible, the use of an exhaust gas sensor 50, 100 (see FIG. 1), which is designed as a broadband lambda sensor (LSU), upstream from four-way catalytic converters 170 or three-way catalytic converters 180 is advantageous. With the aid of these exhaust gas sensors 50, 100 and a lambda regulation, the lambda values which differ from λ=1 within both exhaust gas channels 20, 70 may be exactly adjusted. In addition, a further control loop based on exhaust gas sensor 160 (see FIG. 1), which is designed as a Nernst sensor, may be used in shared exhaust gas channel 140 downstream from three-way catalytic converter 180, which is designed as main catalytic converter 150, to be able to set the overall mixture optimally to the conversion point of the catalytic converters.

FIG. 4 shows a further embodiment of the present invention, in which a three-way catalytic converter 180 (TWC) is situated in each of initially separate exhaust gas channels 20, 70 of engine block 10 before the Y-assemblage and an $NO_x$ storage catalytic converter 200 (NSC) having downstream particle filter 190 is situated after the Y-assemblage in shared exhaust gas channel 140. Alternatively, the two primary catalytic converters 40, 90 or 180 and/or three-way catalytic converter 180, which is designed as main catalytic converter 150, may also each be designed as a combined $NO_x$ storage catalytic converter 200 having a three-way functionality, as is schematically shown in FIG. 4.

According to the exemplary embodiments and/or exemplary methods of the present invention, the regeneration of particle filter 190, i.e., the burn-off of the accumulated particles, is coupled to the desulfurization of $NO_x$ storage catalytic converter 200 (NSC). For this purpose, on the one hand, high exhaust gas temperatures and a rich introduction are required for the desulfurization of the NSC and, on the other hand, high exhaust gas temperatures, but also a lean gas for combusting the soot particles at the same time, are also necessary for regenerating the particle filter (GPF).

In regard to the regeneration frequency, a desulfurization of the NSC is required approximately every 500 km to 2000 km depending on the sulfur content of the fuel and the size of the $NO_x$ storage catalytic converter 200. The active regeneration of the gasoline particle filter (GPF) must occur in the magnitude of approximately 500 km to several thousand kilometers depending on the soot emission of the engine, design of the particle filter, and operating mode of the vehicle (exhaust gas temperature, coasting phases).

Since both the physical boundary conditions and also the regeneration frequency are similar in both systems (NSC and GPF), it is advantageous to combine both regenerations into one phase and to adapt them to one another. For this purpose, the NSC is initially heated up and desulfurized by a mixture which is rich in total. Subsequently, the mixture is made lean, in order to regenerate the GPF. This operating strategy may fundamentally also be used in single-pipe exhaust gas systems, in which an NSC is used in combination with a GPF in the exhaust gas channel.

What is claimed is:
1. A method for regenerating at least one exhaust gas aftertreatment component for filtering soot particles in an internal combustion engine, wherein the internal combustion engine has a first group of cylinders, whose exhaust gases are guided through a first exhaust gas channel and whose fuel/air mixture ratio is set via a first fuel metering system, which activated via a control unit, by a first control loop for setting a first lambda value based on the signal of the first exhaust gas sensor, which is situated in the first exhaust gas channel in the flow direction of the exhaust gas, upstream from a first exhaust gas aftertreatment component for filtering the soot particles, and has at least one second group of cylinders, whose exhaust gases are guided through a further exhaust gas channel and whose fuel/air mixture ratio is set via a further fuel metering system by a further control loop to set a further lambda value based on the signal of a further exhaust gas sensor, which is situated in the further exhaust gas channel in the flow direction of the exhaust gas upstream from a second exhaust gas aftertreatment component for filtering the soot particles, the first and second exhaust gas channels being joined together downstream from the first and second exhaust gas aftertreatment components for filtering the soot particles to form a shared exhaust gas channel, in which a shared catalytic converter is situated, the method comprising:
  selecting the first exhaust gas aftertreatment component situated in the first exhaust gas channel for regeneration; and
  regenerating the first exhaust gas aftertreatment component by initially heating up the first exhaust gas aftertreatment component followed by (i) setting a first lambda value in the first exhaust gas channel, assigned to the first cylinder group, to a lambda value $\lambda>1$ with the aid of a lambda modulation, and (ii) simultaneously setting a second lambda value $\lambda<1$, in the second exhaust gas channel assigned to the second cylinder group, whereby a total lambda value $\lambda=1$ results in the shared exhaust gas channel.

2. The method of claim 1, wherein particle filters or four-way catalytic converters are used as the particle-filtering components, the four-way catalytic converters being configured as catalytically coated filter substrates made of ceramic.

3. The method of claim 1, wherein a further lambda control loop having a further exhaust gas sensor, which is situated downstream from the shared catalytic converter in the flow direction of the exhaust gas, is additionally used.

4. The method of claim 1, wherein a three-way catalytic converter is used as the shared catalytic converter in the shared exhaust gas channel and a four-way catalytic converter or a combination of a three-way catalytic converter and a particle filter connected downstream therefrom is used as the catalytic converters in each of the separate exhaust gas channels.

5. The method of claim 1, wherein the exhaust gas aftertreatment components are particle-filtering components, which are at least partially combined with an $NO_x$ storage catalytic converter, and wherein the regeneration of the particle-filtering components and a desulfurization of the $NO_x$ storage catalytic converter are combined in one chronological phase and adapted to one another.

6. A method for regenerating at least one exhaust gas aftertreatment component for filtering soot particles in an internal combustion engine, wherein the internal combustion engine has a first group of cylinders, whose exhaust gases are guided through a first exhaust gas channel and whose fuel/air mixture ratio is set via a first fuel metering system, which activated via a control unit, by a first control loop for setting a first lambda value based on the signal of the first exhaust gas sensor, which is situated in the first exhaust gas channel in the flow direction of the exhaust gas, upstream from a first exhaust gas aftertreatment component for filtering the soot particles, and has at least one second group of cylinders, whose exhaust gases are guided through a further exhaust gas channel and whose fuel/air mixture ratio is set via a further fuel metering system by a further control loop to set a further lambda value based on the signal of a further exhaust gas sensor, which is situated in the further exhaust gas channel in the flow direction of the exhaust gas upstream from a second exhaust gas aftertreatment component for filtering the soot particles, the first and second exhaust gas channels being joined together downstream from the first and second exhaust gas aftertreatment components for filtering the soot particles to form a shared exhaust gas channel, in which a shared catalytic converter is situated, the method comprising:
  regenerating the first and second exhaust gas aftertreatment components with the aid of engine-internal measures and a lambda modulation, wherein the exhaust gas aftertreatment components are particle-filtering components, which are at least partially combined with an $NO_x$ storage catalytic converter, and wherein the regeneration of the particle-filtering components and a desulfurization of the $NO_x$ storage catalytic converter are combined in a joint chronological regeneration phase and adapted to one another;
  wherein, in the joint regeneration phase, the desulfurization of the $NO_x$ storage catalytic converter is initially carried out, in that the $NO_x$ storage catalytic converter is heated up by engine-internal measures and a lambda value $\lambda<1$ is set, and after completed desulfurization of the $NO_x$ storage catalytic converter, a lambda value $\lambda>1$ is set for regenerating the particle-filtering components.

7. The method of claim 6, wherein the frequency of the regeneration phases for the particle-filtering components and the $NO_x$ storage catalytic converter is determined as at least one of (i) a function of a soot load, which is predicted from a model or measured using particle sensors, and (ii) as a function of a sulfur content of the fuel used.

8. A device for regenerating exhaust gas aftertreatment components for filtering soot particles in an internal combustion engine, comprising:
  a control unit for regenerating the exhaust gas aftertreatment components for filtering soot particles in the internal combustion engine;
  wherein the internal combustion engine includes a first group of cylinders, whose exhaust gases are guided through a first exhaust gas channel and whose fuel/air mixture ratio is settable via a first fuel metering system, activated via the control unit, by a first control loop for setting a first lambda value based on the signal of a first exhaust gas sensor, which is situated in the exhaust gas channel in the flow direction of the exhaust gas upstream from a catalytic converter, and having at least one further group of cylinders, whose exhaust gases are guided through a further exhaust gas channel and whose fuel/air mixture ratio is settable via a further fuel metering system by a further control loop to set a further lambda value based on the signal of a further exhaust gas sensor, which is situated in the exhaust gas channel in the flow direction of the exhaust gas upstream from a catalytic converter, the separate exhaust gas channels being joined together after the catalytic converters to form a shared exhaust gas channel, in which a shared catalytic converter is situated;
  wherein the exhaust gas aftertreatment components for filtering the soot particles are each situated in the still separate exhaust gas channels or are situated in the shared exhaust gas channel, and engine-internal measures for heating up these components are predefinable separately for the cylinder groups using the control unit, and for both exhaust gas channels the lambda value is settable by separate lambda modulations in the two exhaust gas channels;
  wherein the exhaust gas aftertreatment components are particle-filtering components, which are at least partially combined with an $NO_x$ storage catalytic converter, and wherein a regeneration of the particle-filtering components and a desulfurization of the $NO_x$ storage catalytic converter are combined in a joint chronological regeneration phase and adapted to one another; and wherein, in the joint regeneration phase, the desulfurization of the $NO_x$ storage catalytic converter is initially carried out, in that the $NO_x$ storage converter is heated up by engine-internal measures and a lambda value $\lambda<1$ is set, and after completed desulfurization of the $NO_x$ storage converter, a lambda value $\lambda>1$ is set for regenerating the particle-filtering components.

\* \* \* \* \*